(12) United States Patent
Ohtomo

(10) Patent No.: US 11,167,657 B2
(45) Date of Patent: Nov. 9, 2021

(54) VEHICLE CHARGING SYSTEM

(71) Applicant: SUBARU CORPORATION, Tokyo (JP)

(72) Inventor: Yosuke Ohtomo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 184 days.

(21) Appl. No.: 16/424,128

(22) Filed: May 28, 2019

(65) Prior Publication Data

US 2020/0094703 A1  Mar. 26, 2020

(30) Foreign Application Priority Data

Sep. 21, 2018 (JP) .............................. JP2018-176939

(51) Int. Cl.
*B60L 53/62* (2019.01)
*B60L 53/16* (2019.01)

(52) U.S. Cl.
CPC .............. *B60L 53/62* (2019.02); *B60L 53/16* (2019.02)

(58) Field of Classification Search
CPC ................................. B60L 53/62; B60L 53/16
USPC ........................................................ 320/109
See application file for complete search history.

(56) References Cited

U.S. PATENT DOCUMENTS

| | | | | |
|---|---|---|---|---|
| 2008/0079392 A1* | 4/2008 | Baarman | ............. | H02J 7/00034 320/108 |
| 2013/0314037 A1* | 11/2013 | Caffy | .................... | H02J 7/0071 320/109 |
| 2014/0111144 A1* | 4/2014 | Mo | ....................... | H01R 13/639 320/107 |
| 2015/0035478 A1* | 2/2015 | Uchiyama | ............... | B60L 1/003 320/107 |
| 2015/0210174 A1* | 7/2015 | Settele | .................... | B60L 53/14 320/109 |

(Continued)

FOREIGN PATENT DOCUMENTS

| | | |
|---|---|---|
| JP | H08-140279 A | 5/1996 |
| JP | 2004-229355 A | 8/2004 |

(Continued)

OTHER PUBLICATIONS

Japanese Office Action, dated Mar. 24, 2020, in Japanese APPlication No. 2018-176939 and English Translation thereof.

*Primary Examiner* — Suresh Memula
(74) *Attorney, Agent, or Firm* — McGinn L.P Law Group, PLLC.

(57) ABSTRACT

A vehicle charging system includes: power supply connectors each coupleable to the power reception connector of a vehicle; a power supply coupled to the power supply connectors and capable of supplying power to at least one of the power supply connectors; a charge completion detector that detects charge completion; a switching unit that, when charge completion in a first vehicle is detected, if a second vehicle is coupled to one of the power supply connectors and is yet to be charged, changes a destination to which the power supply outputs power to the power supply connector coupled to the second vehicle; an unlocking unit that, when charge completion is detected, automatically unlocks the power supply connector that is coupled to a vehicle in which charge completion is detected; and a charge completion indicator that indicates charge completion when charge completion is detected.

19 Claims, 9 Drawing Sheets

(56) References Cited

U.S. PATENT DOCUMENTS

| | | | |
|---|---|---|---|
| 2017/0182902 A1* | 6/2017 | Katayama | B60L 53/65 |
| 2018/0147948 A1* | 5/2018 | Ohiwa | B60L 11/1816 |
| 2019/0202305 A1* | 7/2019 | Jung | B60L 53/305 |
| 2019/0210468 A1* | 7/2019 | Wittl | H02J 7/0027 |

FOREIGN PATENT DOCUMENTS

| | | |
|---|---|---|
| JP | 2011-135660 A | 7/2011 |
| JP | 2013-070500 A | 4/2013 |
| JP | 2013-223345 A | 10/2013 |
| JP | 2014-192947 A | 10/2014 |
| JP | 2015-023747 A | 2/2015 |
| JP | 2015-136203 A | 7/2015 |
| JP | 2016-059189 A | 4/2016 |
| JP | 2017-011955 A | 1/2017 |
| JP | 2018-088767 A | 6/2018 |

* cited by examiner

VEHICLE CHARGING SYSTEM

CROSS-REFERENCE TO RELATED APPLICATIONS

The present application claims priority from Japanese Patent Application No. 2018-176939 filed on Sep. 21, 2018, the entire contents of which are hereby incorporated by reference.

BACKGROUND

The disclosure relates to a vehicle charging system and, in particular, to a vehicle charging system for use in charging a vehicle such as an electric vehicle or a plug-in hybrid vehicle.

Recent years have seen widespread commercial use of plug-in hybrid vehicles (PHVs) and electric vehicles (EVs). In PHVs, fuel efficiency (mileage) can be improved effectively by using both an engine and an electric motor, and EVs, in which only an electric motor is used as a power source, do not discharge exhaust fumes. Such a plug-in hybrid vehicle and an electric vehicle have a battery module (high-voltage battery) in which, for example, secondary batteries (battery cells) such as lithium-ion batteries are connected in series.

As plug-in hybrid vehicles and electric vehicles are becoming common, for example, an increasing number of vehicle charging systems (e.g., see Japanese Unexamined Patent Application Publication No. 2017-11955 and Japanese Unexamined Patent Application Publication No. 2014-192947) are installed in the parking lots of, for example, commercial facilities and public facilities.

Normally, it takes several tens of minutes to a few hours to charge a high-voltage battery installed in a plug-in hybrid vehicle (PHV) or an electric vehicle (EV). Thus, the following charging method has been proposed. For example, a vehicle charging system is installed in the parking lot of, for example, a commercial facility or a public facility (e.g., shopping mall or theme park). A user couples the power supply connector (charging gun) of a charging device (charger) to their vehicle, and while the vehicle is being charged, the user spends time, for example, in the commercial facility or the public facility. By the time the user returns to the parking lot, the charging will have been completed.

SUMMARY

An aspect of the disclosure provides a vehicle charging system. The vehicle charging system includes a plurality of power supply connectors, a power supply, a charge completion detector, a switching unit, an unlocking unit, and a charge completion indicator. Each of the plurality of power supply connectors is coupleable to a power reception connector of a vehicle. The power supply is coupled to the plurality of power supply connectors and capable of supplying power to at least one of the plurality of power supply connectors. The charge completion detector is configured to detect charge completion. The switching unit is configured to, when charge completion in a first vehicle is detected, if a second vehicle is coupled to one of the plurality of power supply connectors and is yet to be charged, change a destination to which the power supply outputs power to the power supply connector coupled to the second vehicle. The unlocking unit is configured to, when charge completion is detected, automatically unlock a power supply connector coupled to a vehicle in which charge completion is detected, the power supply connector being one of the plurality of power supply connectors. The charge completion indicator is configured to, when charge completion is detected, identify the power supply connector coupled to the vehicle in which charge completion is detected and indicate charge completion.

An aspect of the disclosure provides a vehicle charging system. The vehicle charging system includes a plurality of power supply connectors, a power supply, and circuitry. Each of the plurality of power supply connectors is coupleable to a power reception connector of a vehicle. The power supply is coupled to the plurality of power supply connectors and capable of supplying power to at least one of the plurality of power supply connectors. The circuitry is configured to detect charge completion. The circuitry is configured to, when charge completion in a first vehicle is detected, if a second vehicle is coupled to one of the plurality of power supply connectors and is yet to be charged, change a destination to which the power supply outputs power to the power supply connector coupled to the second vehicle. The circuitry is configured to, when charge completion is detected, automatically unlock a power supply connector coupled to a vehicle in which charge completion is detected, the power supply connector being one of the plurality of power supply connectors. The circuitry is indicator configured to, when charge completion is detected, identify the power supply connector coupled to the vehicle in which charge completion is detected and indicate charge completion.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
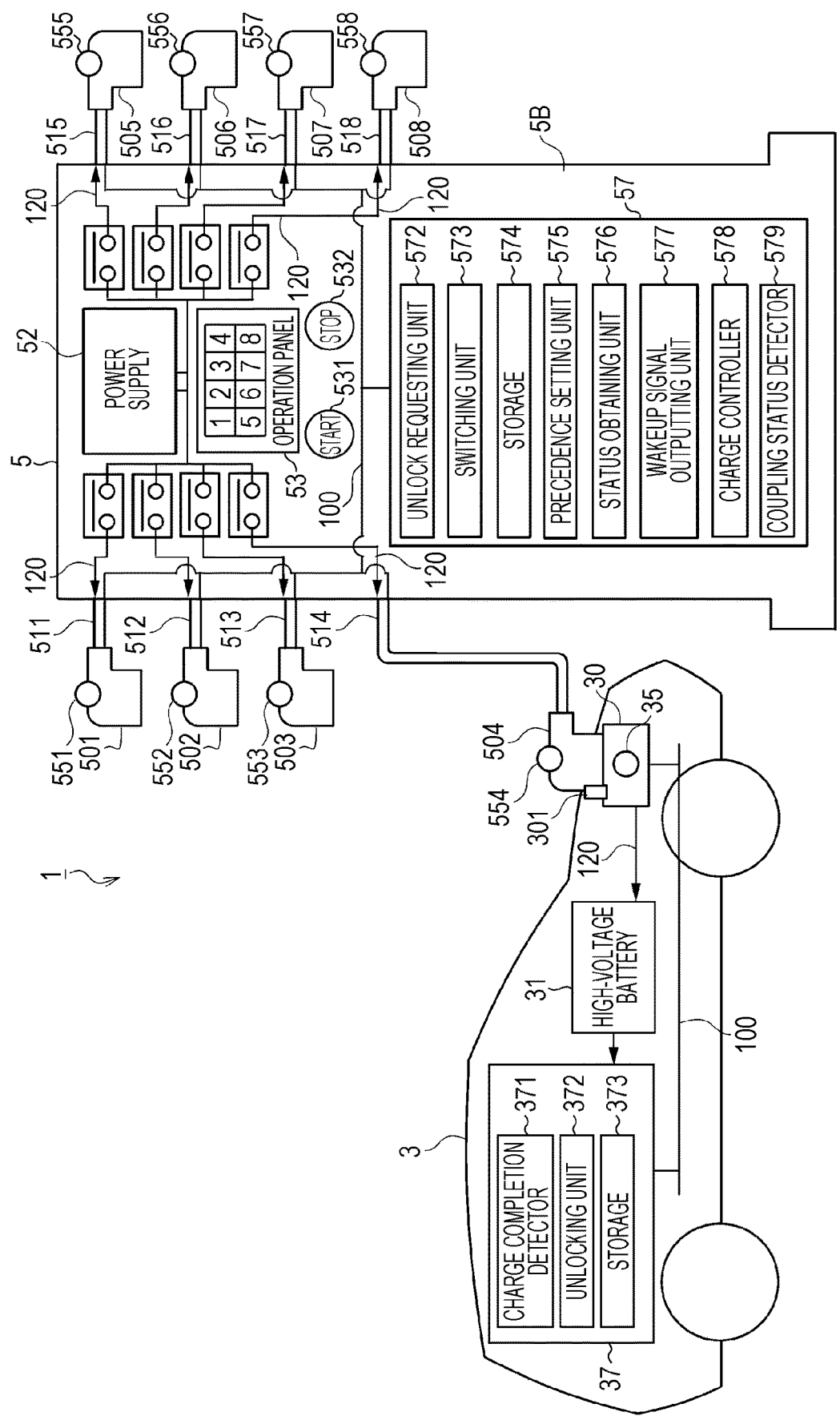
FIG. 1 is a block diagram illustrating a configuration of a vehicle charging system according to an embodiment.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. If a charging method as described above is employed, when a power supply connector remains coupled to a vehicle even after charging has been completed, another user cannot use the power supply connector (that is, another vehicle cannot be charged until the power supply connector is removed from the vehicle). This means that another user is expected to wait there until the power supply connector becomes available. To avoid such a situation, a user whose vehicle started charging first is expected to return to a parking lot (charging facility) around the time when the charging is completed to remove the power supply connector. However, this may not be convenient. It should be noted that trying to forcibly remove the locked power supply connector may break a part such as a coupled portion (charging port).

The disclosure has been made to address the above problems, and it is desirable to provide a more convenient vehicle charging system capable of using a power charging device more efficiently.

Figure 2:
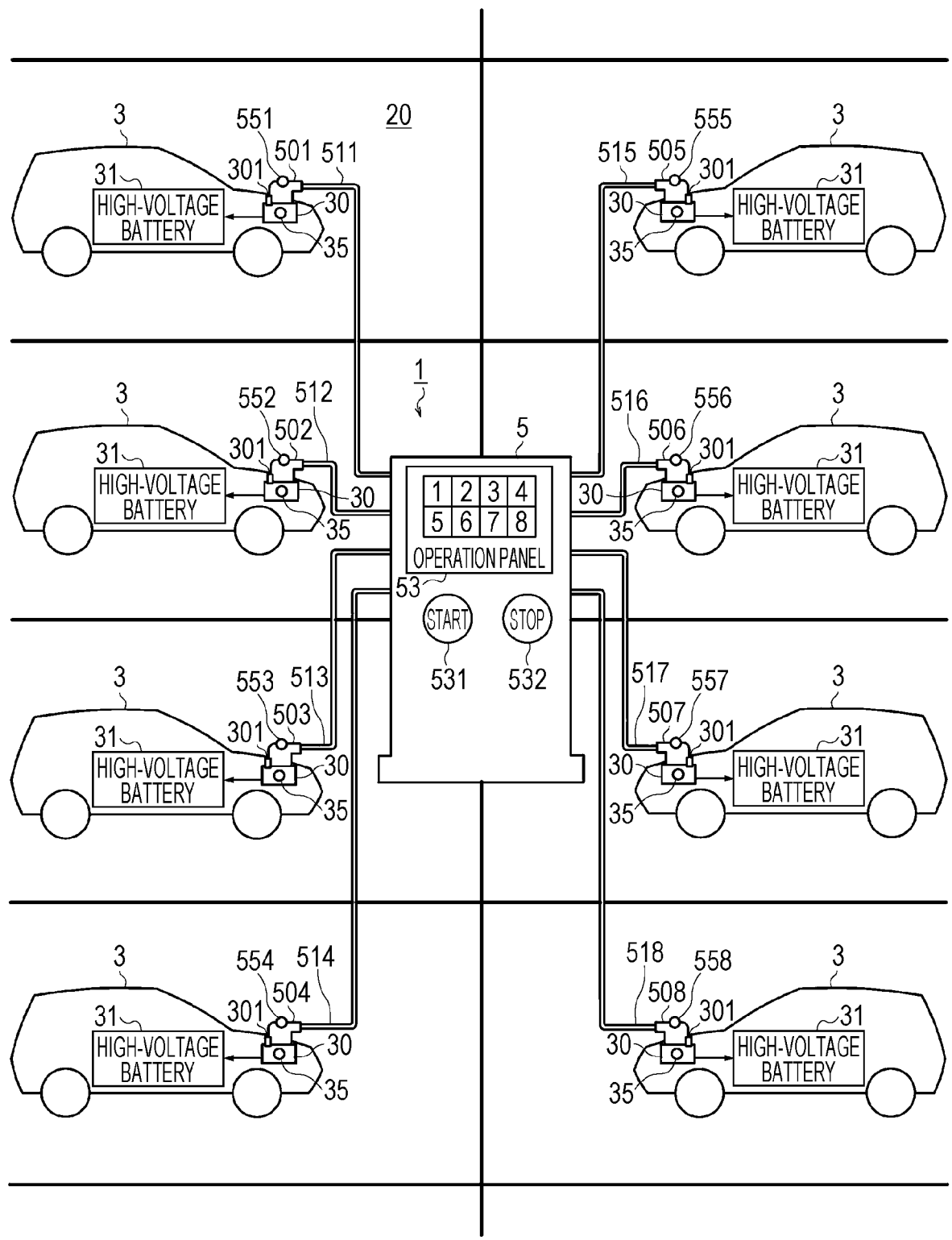
FIG. 2 illustrates an example of a charging facility in which the vehicle charging system according to the example is installed.

With reference to FIGS. 1 and 2, a configuration of a vehicle charging system 1 according to the embodiment is described. FIG. 1 is a block diagram illustrating the configuration of the vehicle charging system 1. FIG. 2 illustrates an example of a charging facility (parking lot) in which the vehicle charging system 1 is installed. It should be noted that FIGS. 1 and 2 illustrate only a configuration related to charging of a high-voltage battery 31, which is extracted from a configuration of a vehicle 3, and exclude other configurations such as a configuration of a driving mechanism.

The vehicle 3 is an externally chargeable plug-in vehicle such as an electric vehicle (EV) or a plug-in hybrid vehicle (PHV). The vehicle charging system 1 charges the high-voltage battery 31 installed in the vehicle 3. The vehicle charging system 1 is installed in the parking lot of, for example, a commercial facility or a public facility, such as a shopping mall or a theme park. The vehicle charging system 1 primarily includes the vehicle 3 and a charging device (charger) 5.

The vehicle 3 includes a motor generator as a driving power source and the high-voltage battery 31, which supplies power to the motor generator, and is a plug-in hybrid vehicle or an electric vehicle having the high-voltage battery 31 externally chargeable by the charging device 5. The high-voltage battery 31 is made up of, for example, several tens to several hundreds of battery cells connected in series (i.e., a high-voltage battery of several tens to several hundreds of volts). For example, lithium-ion batteries are used as suitable battery cells. However, instead of lithium-ion batteries, chargeable and dischargeable secondary batteries such as nickel-cadmium batteries can be used. The high-voltage battery 31 of the vehicle 3 is charged using power supplied by the charging device 5.

The vehicle 3 has an openable and closeable charging lid having inside a power reception connector 30 coupleable to (fit into) a power supply connector 50 of the charging device 5. The power reception connector 30 has, for example, a pair of (+, −) power reception terminals coupled to a power line 120, a pair of communication terminals coupled to a communication line (CAN100), and a wakeup signal terminal (not illustrated) coupled to a wakeup signal line. By coupling the power reception connector 30 and power supply connector 50 to each other, the power line 120, the communication line (CAN100), and the wakeup signal line provided in the vehicle 3 are coupled to a power line 120, a communication line (CAN100), and a wakeup signal line provided in the charging device 5 via the power reception connector 30 and the power supply connector 50. This enables supply of power, communication of various information, and supply of a wakeup signal.

The power reception connector 30 also has a lock mechanism 301 for locking the coupled power reception connector 30 and power supply connector 50 of the charging device 5. The lock mechanism 301 may be, for example, an electromagnetic lock mechanism. A control unit (CU) 37 controls locking and unlocking performed by the lock mechanism 301. It should be noted that the charging device 5 (power supply connector 50) may have the lock mechanism 301.

The charging lid has a charge completion indicating lamp 35 inside, that is, near the power reception connector 30. The charge completion indicating lamp 35 is made of, for example, an LED and indicates charge completion when charge completion is detected. In one embodiment, the charge completion indicating lamp 35 may serve as a "charge completion indicator". It should be noted that the charge completion indicating lamp 35 may be disposed in the charging device 5 only or in both the vehicle 3 and the charging device 5. Charge completion may be indicated by, for example, a sound instead of or in addition to an indication by the charge completion indicating lamp 35.

The control unit (CU) 37 controls charging of the high-voltage battery 31. Thus, the control unit 37 functionally has a charge completion detector 371, an unlocking unit 372, and storage 373.

The control unit 37 includes, for example, a CPU, non-volatile memory such as EEPROM, RAM, and an input/output interface (I/F). The CPU performs calculations. The non-volatile memory stores, for example, a program or data for use in causing the CPU to perform various processing. The RAM temporarily stores various data such as a calculation result. The input/output interface (I/F) includes a driving circuit (driver circuit) for driving, for example, the lock mechanism 301 and the charge completion indicating lamp 35. In the control unit 37, as a result of the CPU running the program stored in, for example, the EEPROM, the charge completion detector 371, the unlocking unit 372, and the storage 373 are caused to function.

The charge completion detector 371 detects charge completion. In one embodiment, the charge completion detector 371 may serve as a "charge completion detector". More specifically, for example, when the state of charge (SOC) of the high-voltage battery 31 reaches a predetermined value (e.g., 80%) or when the voltage value of the high-voltage battery 31 reaches a predetermined voltage (e.g., 400 V), the charge completion detector 371 determines that charging has been completed. Information indicating the detection of charge completion is output to the unlocking unit 372 and transmitted to the charging device 5 through the CAN100s coupled to each other via the power reception connector 30 and the power supply connector 50. It should be noted that the charging device 5 may determine charge completion.

When charge completion is detected, the unlocking unit 372 automatically unlocks the lock mechanism 301 of the power reception connector 30. In one embodiment, the unlocking unit 372 may serve as an "unlocking unit". Here, if the storage 373 stores information indicating that the charging device 5 is a public charging device (public charging device flag), after charge completion is detected or after a predetermined period has elapsed since charge initiation, the unlocking unit 372 unlocks the locked power reception connector 30 and power supply connector 50. However, if the storage 373 does not store the information indicating that the charging device 5 is a public charging device (public charging device flag) (that is, if the charging device 5 is a home charging device), even after charge completion is detected or even after the predetermined period has elapsed since the charge initiation, the unlocking unit 372 does not unlock the locked power reception connector 30 or power supply connector 50. When the unlocking unit 372 unlocks the locked power reception connector 30 and power supply connector 50, a user can remove the unlocked power supply connector 50 from the vehicle 3 that has completed charging. It should be noted that the unlocking unit 372 may be disposed in the charging device 5 but not in the vehicle 3.

The storage 373 is memory such as RAM and stores, for example, the information indicating that the charging device 5 is a public charging device (public charging device flag), which is received via the CAN100s.

The charging device (charger) 5 charges the high-voltage battery 31 installed in the vehicle 3. It should be noted that the charging device 5 may be a fast charger or a normal charger. In addition, any charging standards (e.g., CHAdeMO (registered trademark) and CCS) are applicable.

The charging device (charger) 5 primarily includes a main body 5B, charging cables 511 to 518, and power supply connectors 501 to 508. The main body 5B primarily includes a power supply 52, an operation panel 53, a charge start switch 531, a charge stop switch 532, charge completion indicating lamps 551 to 558, and a control unit (CU) 57. The control unit (CU) 57 functionally includes an unlock requesting unit 572, a switching unit 573, storage 574, a precedence setting unit 575, a status obtaining unit 576, a wakeup signal outputting unit 577, a charge controller 578, and a coupling status detector 579.

The multiple (eight in this embodiment) charging cables 511 to 518 are coupled to the main body 5B (power supply 52) of the charging device 5. It should be noted that hereinafter, the eight charging cables 511 to 518 may be collectively referred to as charging cables 51. The eight power supply connectors 501 to 508, each coupleable to the power reception connector 30 of the vehicle 3, are coupled to the respective ends of the eight charging cables 511 to 518. It should be noted that hereinafter, the eight power supply connectors 501 to 508 may be collectively referred to as the power supply connectors 50. It should be noted that the charging cables 511 to 518 and the power supply connectors 501 to 508 do not necessarily have to be eight charging cables and eight power supply connectors. As long as the number of charging cables are equal to or greater than the number of charging cables to which the power supply 52 can supply power concurrently and the number of power supply connectors are equal to or greater than the number of power supply connectors to which the power supply 52 can supply power concurrently, the number of charging cables and the number of power supply connectors can be set to any numbers.

The power supply connector 50 is coupled to (fit into) the power reception connector 30 of the vehicle 3. As in the case of the power reception connector 30, the power supply connector 50 has, for example, a pair of (+, −) power reception terminals coupled to the power line 120, a pair of communication terminals coupled to the communication line (CAN100), and a wakeup signal terminal (not illustrated) coupled to the wakeup signal line. By coupling the power supply connector 50 and the power reception connector 30 to each other, the power line 120, the communication line (CAN100), and the wakeup signal line provided in the charging device 5 are coupled to the power line 120, the communication line (CAN100), and the wakeup signal line provided in the vehicle 3 via the power supply connector 50 and the power reception connector 30. This enables supply of power, communication of various information, and supply of a wakeup signal. It should be noted that the power supply connector 50 may have a lock mechanism for locking the coupled power supply connector 50 and power reception connector 30 of the vehicle 3.

The charge completion indicating lamps 551 to 558 are attached to the respective power supply connectors 501 to 508. The charge completion indicating lamps 551 to 558 are made of, for example, LEDs. When charge completion is detected or when a predetermined period has elapsed since charge initiation, the charge completion indicating lamps 551 to 558 identify the power supply connector 50 coupled to the vehicle 3 in which charge completion is detected or in which the predetermined period has elapsed since the charge initiation and indicate charge completion. It should be noted that hereinafter, the eight charge completion indicating lamps 551 to 558 may be collectively referred to as charge completion indicating lamps 55. The charge completion indicating lamps 55 enable a user to identify the unlocked power supply connector 50 with which charging has been completed.

The power supply 52 includes, for example, a potential transformer, a rectifier circuit, and a regulator circuit (DC-DC converter) and generates target direct current power (charging power) from external alternating current power. The power supply 52 outputs the generated power to the charging cables 511 to 518 and the power supply connectors 501 to 508 coupled to the power supply 52. In particular, the number of power supply connectors 50 to which the power supply 52 can supply power concurrently (e.g., two) is less than the total number of the power supply connectors 501 to 508 coupled to the power supply 52 (eight in this embodiment). In one embodiment, the power supply 52 may serve as a "power supply". It should be noted that the control unit 57 (switching unit 573) switches between destinations to which the power supply 52 outputs power, that is, changes a destination to which power is supplied between the charging cables 511 to 518 and changes a destination to which power is supplied between the power supply connectors 501 to 508.

The operation panel 53, which is, for example, a touch panel, displays, for example, the setting of charging, the state of charge, or an operation screen and receives, for example, a user instruction to specify a number assigned to the power supply connector 50 whose power supply will be started or stopped. The operation panel 53 is coupled to the control unit 57 and outputs, for example, the received instruction information to the control unit 57.

The charge start switch 531 is, for example, a push-button switch and receives a charge start instruction. In one embodiment, the operation panel 53 and the charge start switch 531 may serve as a "start instruction receiving unit". The charge start switch 531 is coupled to the control unit 57 and outputs the received charge start instruction information to the control unit 57.

The charge stop switch 532 is, for example, a push-button switch and receives a charge stop instruction. In one embodiment, the operation panel 53 and the charge stop switch 532 may serve as a "stop instruction receiving unit". The charge stop switch 532 is coupled to the control unit 57 and outputs the received charge stop instruction information to the control unit 57.

The control unit (CU) 57 comprehensively controls the charging device 5 in accordance with user instruction information read from, for example, the operation panel 53, the charge start switch 531, and the charge stop switch 532 and various information such as a charging parameter and charge completion information that are received from the control unit 37 of the vehicle 3 via the CAN100s. As such, as described above, the control unit 57 functionally includes the unlock requesting unit 572, the switching unit 573, the storage 574, the precedence setting unit 575, the status obtaining unit 576, the wakeup signal outputting unit 577, the charge controller 578, and the coupling status detector 579.

The control unit 57 includes, for example, a CPU, non-volatile memory such as EEPROM, RAM, and an input/output interface (I/F). The CPU performs calculations. The non-volatile memory stores a program or data for use in causing the CPU to perform various processing. The RAM temporarily stores various data such as a calculation result. In the control unit 57, these components are caused to function as a result of the CPU running the program stored in, for example, the EEPROM.

When charge completion is detected or when a predetermined period has elapsed since charge initiation, the unlock requesting unit 572 requests, via the CAN100s, the control unit 37 of the vehicle 3 to unlock the power supply connector 50 coupled to the vehicle 3 in which charge completion is detected or in which the predetermined period has elapsed since the charge initiation. It should be noted that alternatively, the unlock requesting unit 572 may directly unlock the power supply connector 50.

The switching unit 573 switches between destinations to which the power supply 52 outputs power, that is, changes a destination to which power is supplied between the charging cables 511 to 518 and changes a destination to which power is supplied between the power supply connectors 501 to 508. In particular, when charge completion is detected or a predetermined period has elapsed since charge initiation, if another vehicle 3 is coupled to one of the power supply connectors 50 and is yet to be charged, the destination to which the power supply 52 outputs power is switched to the power supply connector 50 coupled to another vehicle 3. In one embodiment, the switching unit 573 may serve as a "switching unit".

More specifically, individual relays are interposed between the respective power supply connector 50 and the power line 120 coupled to the respective power supply connector 50 and interrupt the respective power lines 120. The switching unit 573 switches on the relay of the power supply connector 50 to which power will be supplied and switches off the relay of the power supply connector 50 whose power supply will be stopped. In this manner, the destination to which power is supplied is changed.

At the time, the switching unit 573 sets the order in which the vehicles 3 are charged to the order in which charge start instructions have been received. Then, in the set order, the switching unit 573 changes the destination to which power is supplied between the power supply connectors 50. However, in accordance with precedence set by the precedence setting unit 575, the switching unit 573 may change the order in which the vehicles 3 are charged and/or the amount of time to charge each of the vehicles 3. It should be noted that when the order in which the vehicles 3 are charged and/or the amount of time to charge each of the vehicles 3 has been changed, it is desirable to transmit the information to, for example, portable terminals of users.

Figure 3:
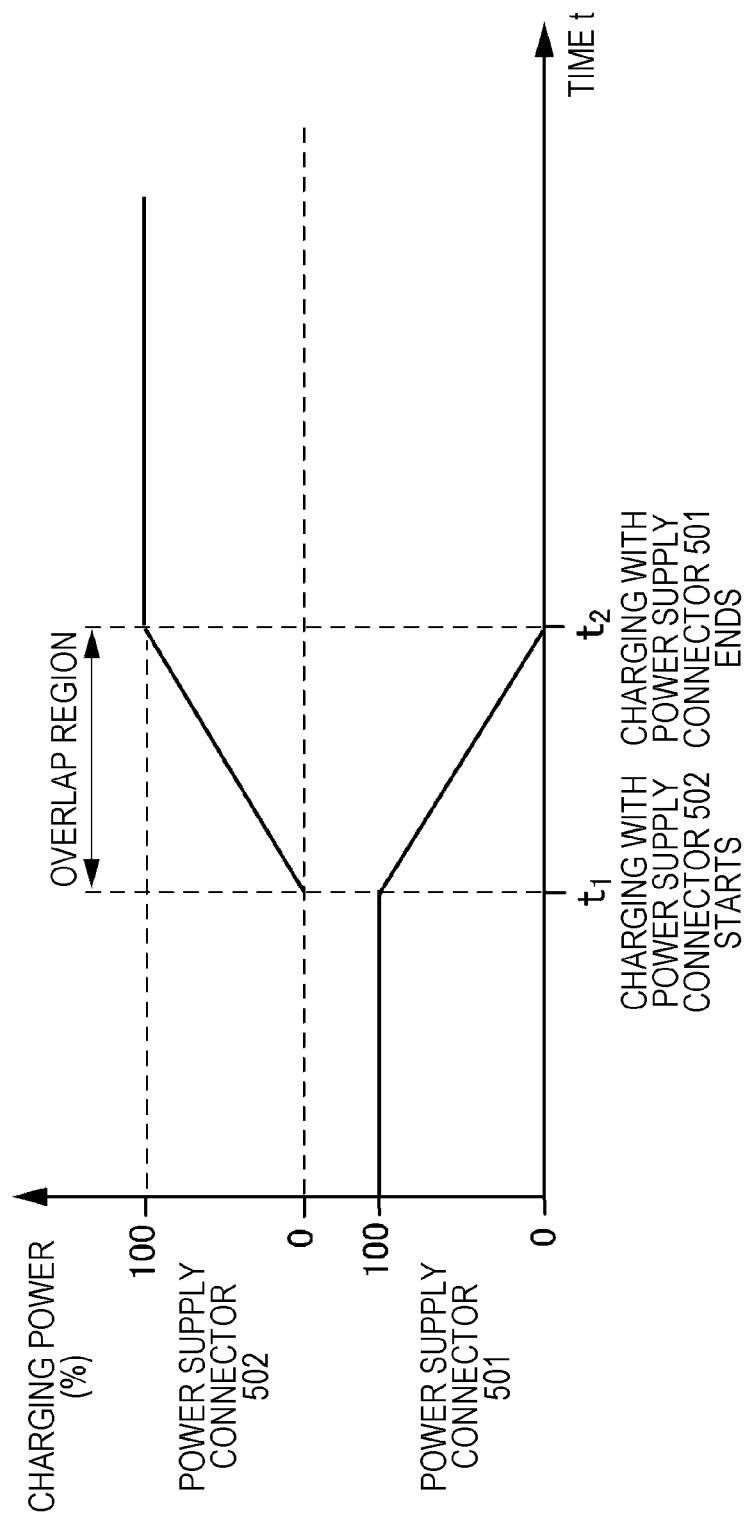
FIG. 3 illustrates an overlapping method regarding charging power supplied when changing a destination to which power is supplied between power supply connectors (vehicles)

When the switching unit 573 and the power supply 52 change the destination to which power is supplied between the power supply connectors 50, as illustrated in FIG. 3, in such a manner that total power does not exceed a rated power output (100%), it is desirable to provide an overlap region in which power supplied to the next power supply connector 50 to receive power is increased in accordance with a decrease in power supplied to the power supply connector 50 currently receiving power.

The storage 574 is memory such as EEPROM and stores, for example, information indicating that the charging device 5 is a public charging device (charger) (public charging device flag). It should be noted that the information indicating that the charging device 5 is a public charging device (public charging device flag) is transmitted to the control unit 37 of the vehicle 3 via the CAN100s.

The precedence setting unit 575 sets precedence (priority) for the order in which the vehicles 3 are charged and/or the amount of time to charge each of the vehicles 3. In one embodiment, the precedence setting unit 575 may serve as a "precedence setting unit". The precedence setting unit 575 sets precedence in consideration of, for example, the status of each user obtained by the status obtaining unit 576 (e.g., member information) or a surcharge.

The status obtaining unit 576 has, for example, a card reader and obtains the status of a user (e.g., member information) from a user's membership card. In one embodiment, the status obtaining unit 576 may serve as a "status obtaining unit". The status of the user obtained by the status obtaining unit 576 is output to the precedence setting unit 575.

The wakeup signal outputting unit 577 outputs via the power supply connector 50 a wakeup signal (e.g., a voltage of 12 V) for driving the low-voltage power source system (12-volt system) of the vehicle 3. When the power supply connector 50 is coupled to the power reception connector 30 of the vehicle 3, the wakeup signal outputting unit 577 transmits a wakeup signal (a voltage of 12 V) to the vehicle 3 to cause the vehicle 3 to enter an ignition-on state. In one embodiment, the wakeup signal outputting unit 577 may serve as an "activation signal outputting unit". It should be noted that in a state in which charging of the vehicle 3 has not been completed and in which the power supply connector 50 remains coupled to the vehicle 3, if the wakeup signal (a voltage of 12 volts) is interrupted, it is desirable to maintain the activated state (ignition-on state) of the vehicle 3 for a predetermined period (e.g., several minutes to several tens of minutes) after the wakeup signal is interrupted.

The charge controller 578 controls driving of the power supply 52. More specifically, the charge controller 578 controls the power supply 52 so that charging power is supplied to the vehicle 3 (high-voltage battery 31) until information indicating detection of charge completion is received from the control unit (CU) 37 (charge completion detector 371) of the vehicle 3 or until a predetermined period (e.g., two hours) has elapsed since charge initiation. It should be noted that the charging device 5 may detect whether the charging has been completed. In particular, the following assumes a case in which a charge stop instruction is received (that is, one of the power supply connectors 50 is selected and the charge stop switch 532 is pressed) in a state in which charging has not been completed or in a state in which a predetermined period has not elapsed since charge initiation. In this case, if the power supply connector 50 is not removed for a fixed period (e.g., five minutes), the charge controller 578 controls the power supply 52 so as to recharge (that is, restart charging) via the power supply connector 50.

The coupling status detector 579 detects whether the power supply connector 50 and the power reception connector 30 are coupled to each other (fit together). Whether the power supply connector 50 and the power reception connector 30 are coupled to each other can be detected in accordance with, for example, an output value output from a sensor provided in an end portion (fit portion) of the power supply connector 50 and/or the communication status of the CAN100s (whether communication is being performed).

For the above configuration, sequential charging of the vehicles 3 is made possible by each user who has parked a vehicle 3 coupling the power reception connector 30 of the vehicle 3 to an available power supply connector 50 or an unlocked power supply connector 50 with which charging of another vehicle 3 has been completed. Here, the following, for example, assumes a case in which power is being supplied to the power supply connectors 501 and 502 and not to the other power supply connectors 503 to 508 (that is, the vehicles 3 are being charged with the power supply connectors 501 and 502). In this case, even if the power supply connector 503 is coupled to the vehicle 3 (power reception connector 30), since power is being supplied to the power supply connectors 501 and 502, power cannot be supplied to the power supply connector 503. Then, even if the power supply connector 504 is coupled to the vehicle 3 (power reception connector 30), since power is being supplied to the power supply connectors 501 and 502, power cannot be supplied to the power supply connector 504.

When, for example, the charge completion of the vehicle 3 coupled to the power supply connector 501 is detected, power supply to the power supply connector 501 is stopped, and power supply to the power supply connector 503, which has been coupled to the vehicle 3 after coupling of the power supply connectors 501 and 502, is started. When, for example, the elapse of a predetermined period (e.g., two hours) since charge initiation is detected in the vehicle 3 coupled to the power supply connector 502, power supply to the power supply connector 502 is stopped, and power supply to the power supply connector 504, which has been coupled to the vehicle 3 after coupling of the power supply connectors 501 to 503 (the next one to receive power in accordance with the precedence), is started.

Figure 4:
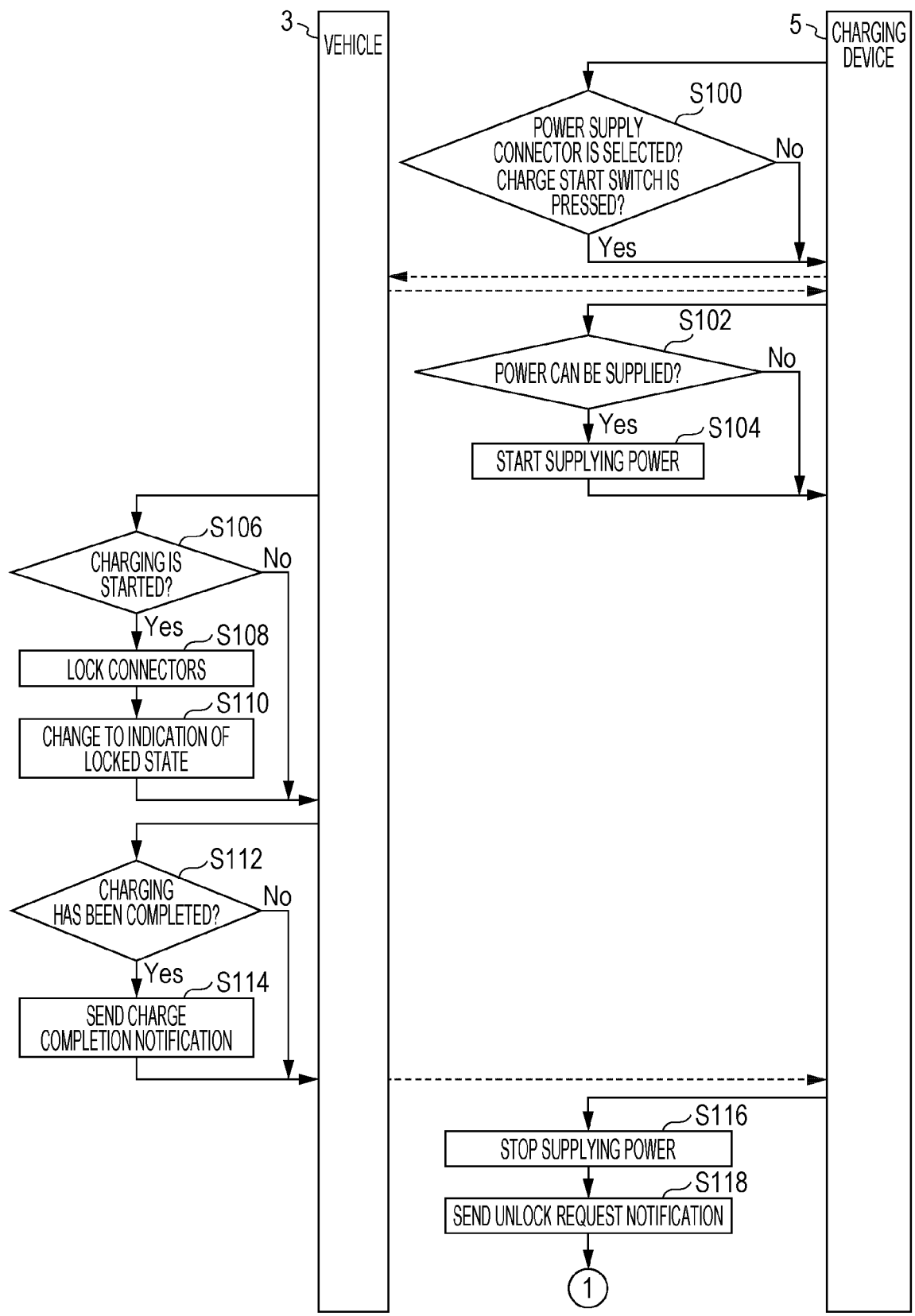
FIG. 4 is a flowchart (1) illustrating the procedure of charging processing (unlock request processing) performed by the vehicle charging system according to the example.
Figure 5:
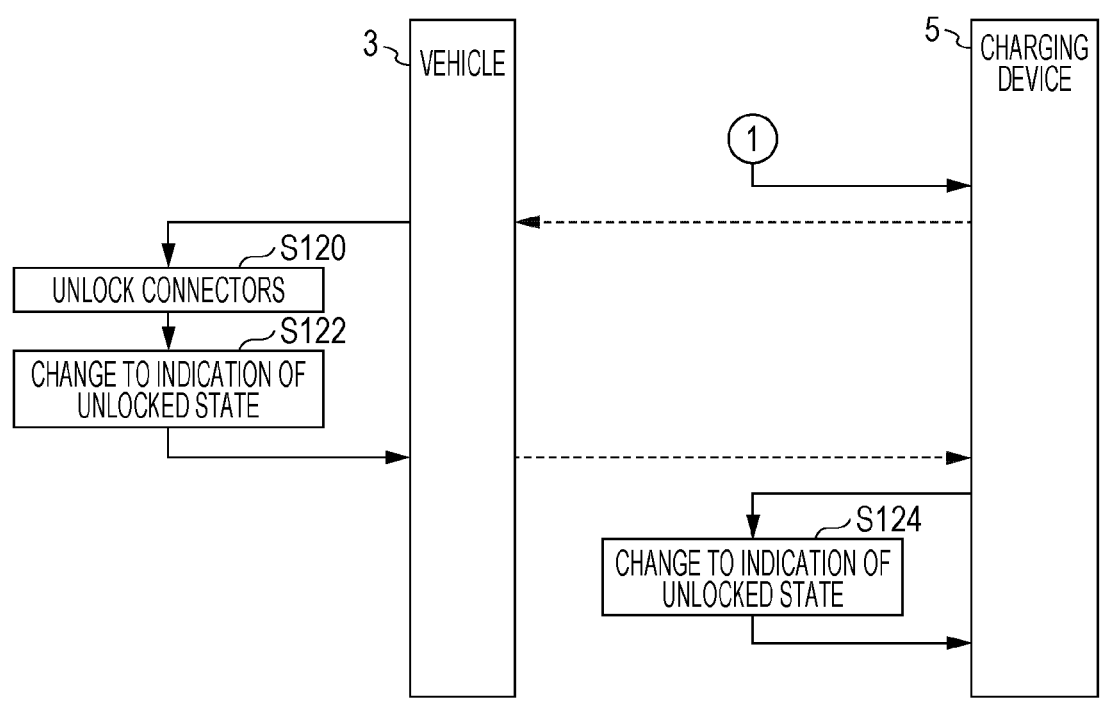
FIG. 5 is a flowchart (2) illustrating the procedure of the charging processing (unlock request processing) performed by the vehicle charging system according to the example.
Figure 6:
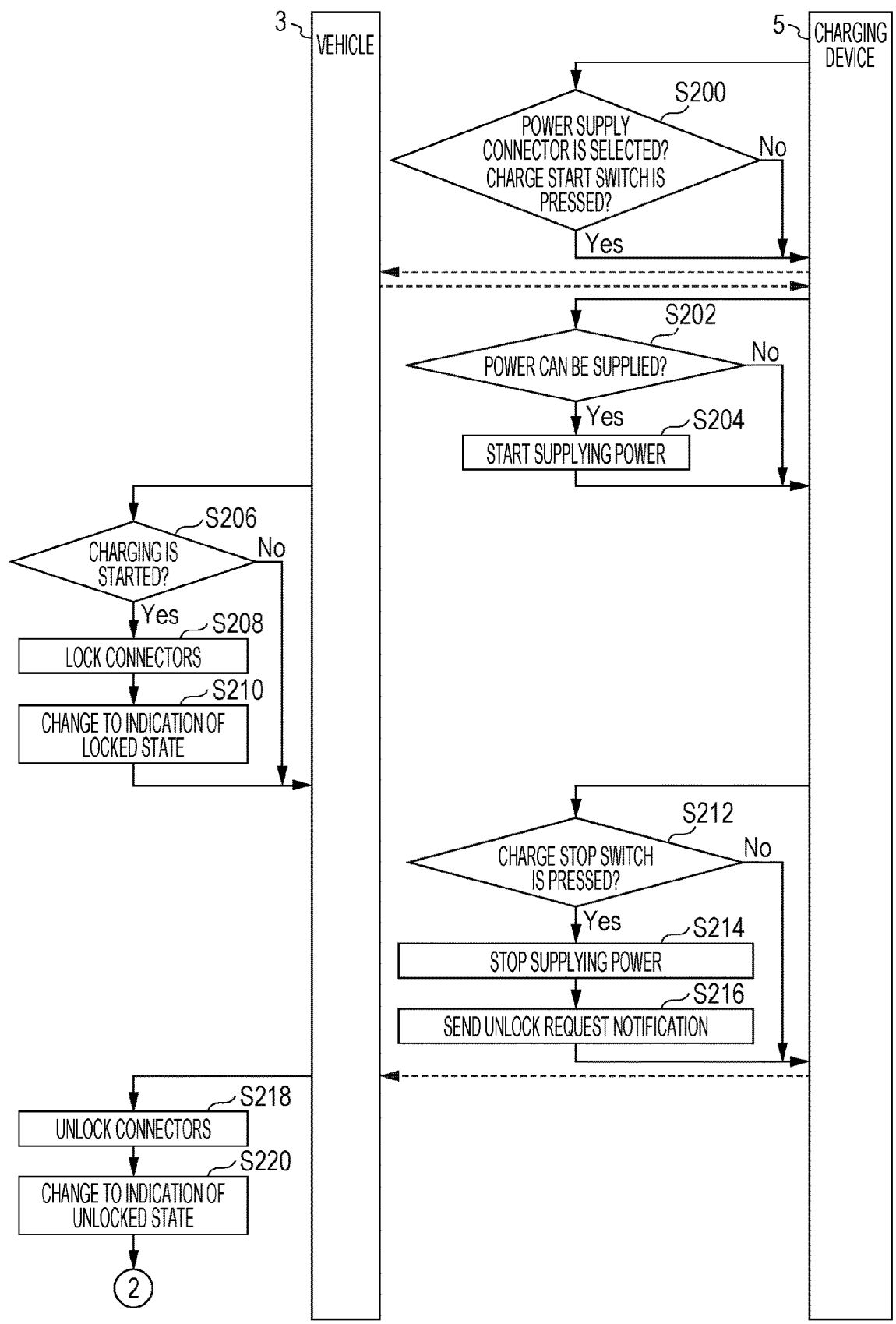
FIG. 6 is a flowchart (1) illustrating the procedure of charging processing (recharging processing) performed by the vehicle charging system according to the example.
Figure 7:
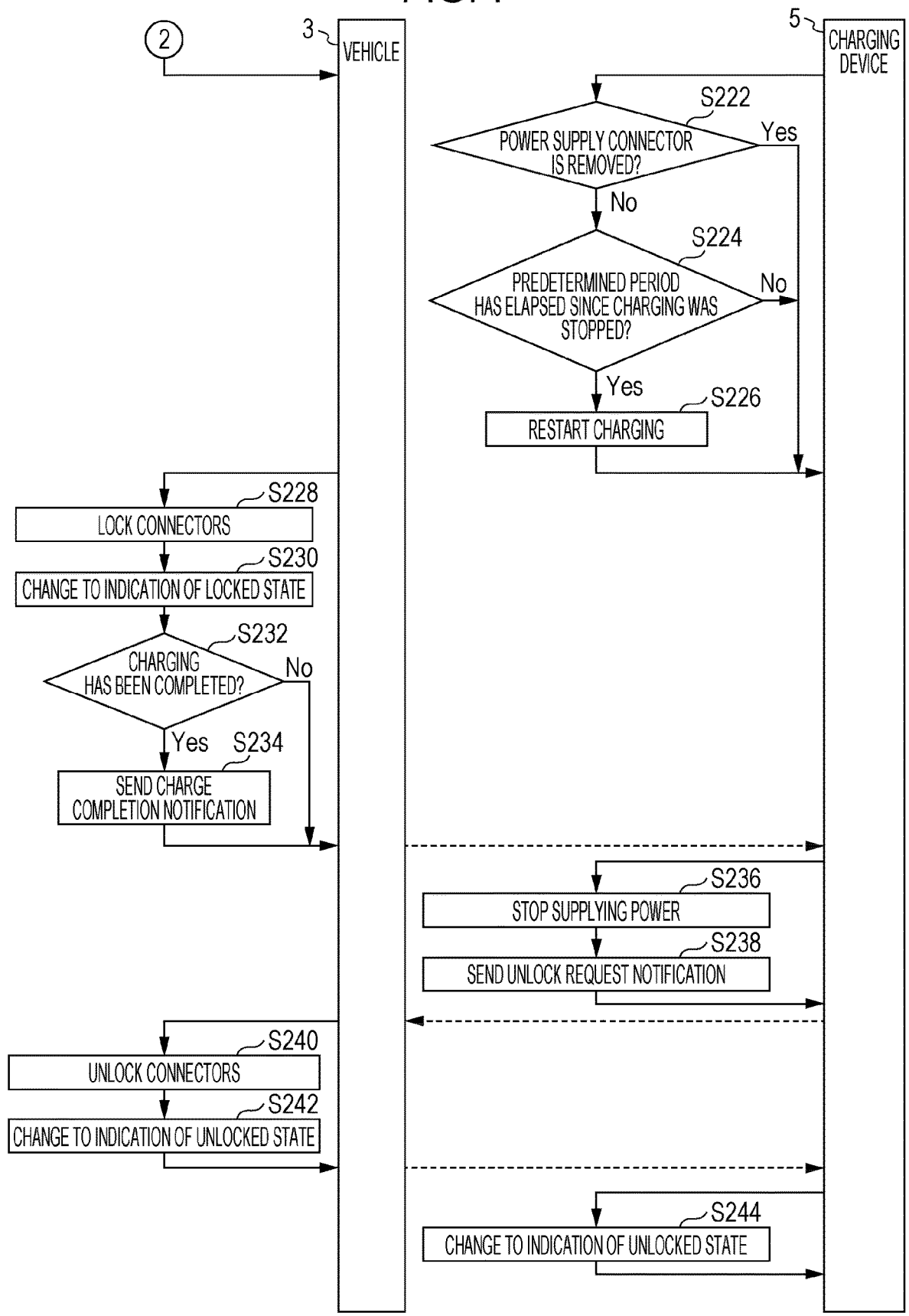
FIG. 7 is a flowchart (2) illustrating the procedure of the charging processing (recharging processing) performed by the vehicle charging system according to the example.
Figure 8:
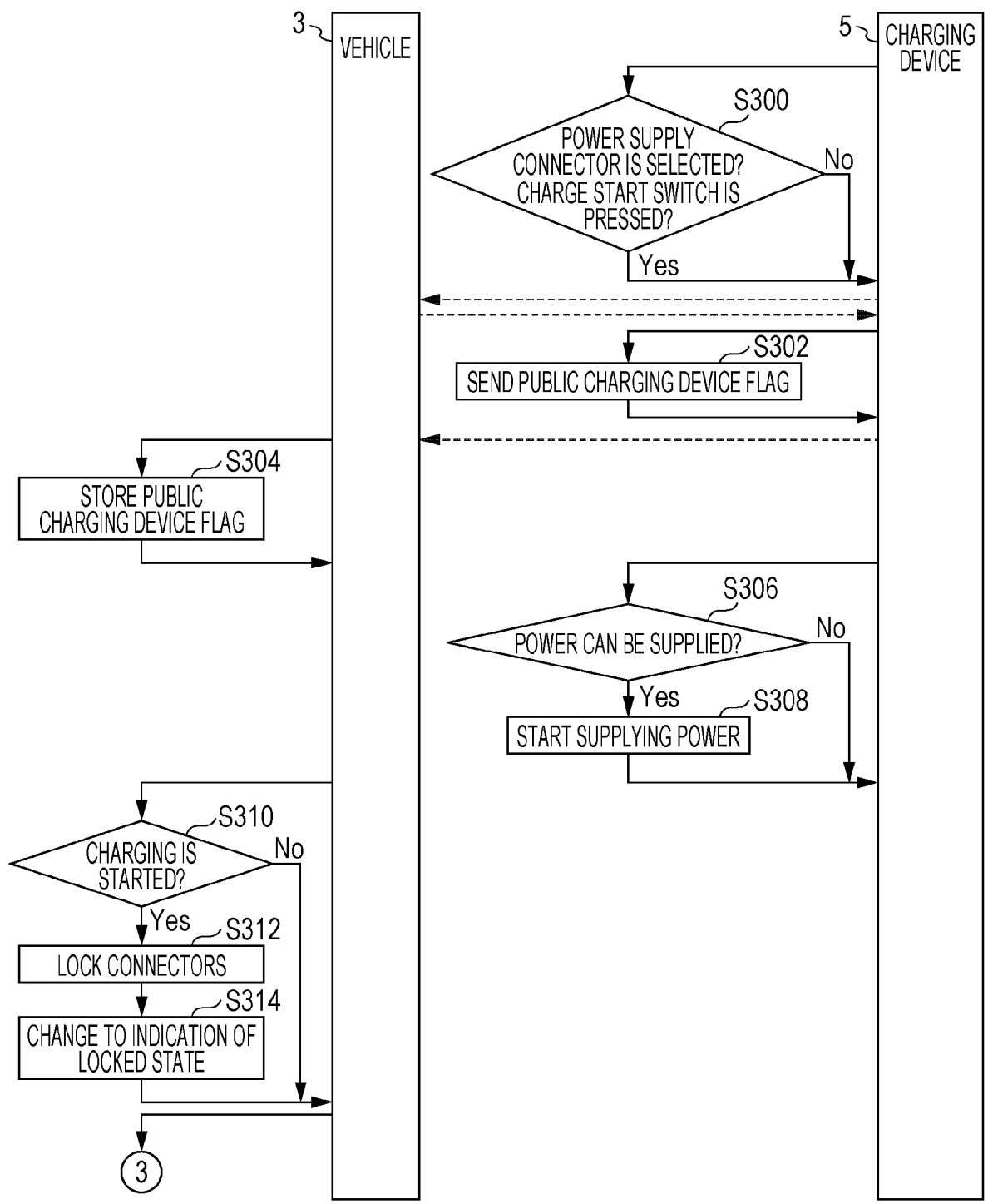
FIG. 8 is a flowchart (1) illustrating the procedure of charging processing (public charging device identifying processing) performed by the vehicle charging system according to the example.
Figure 9:
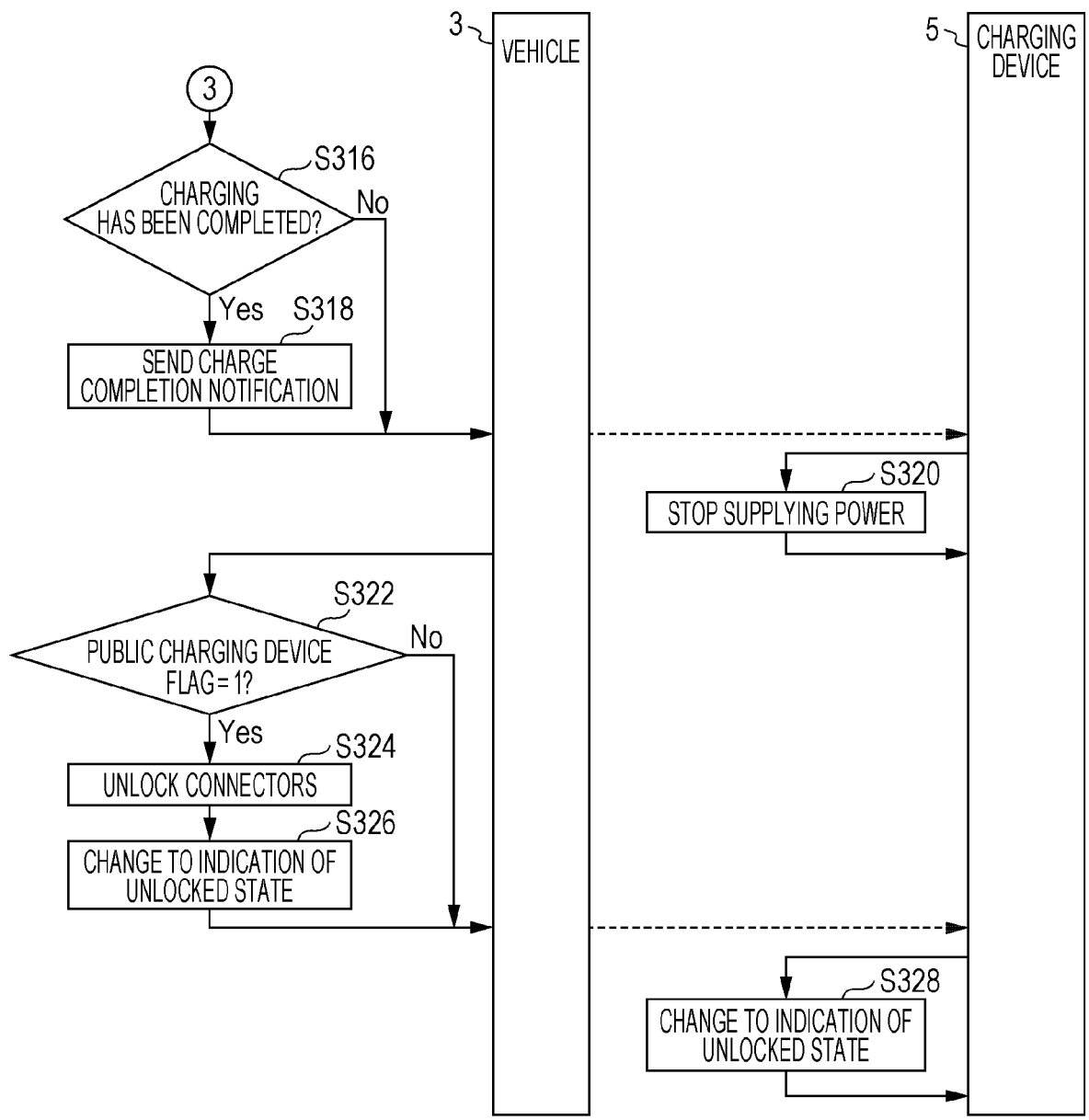
FIG. 9 is a flowchart (2) illustrating the procedure of the charging processing (public charging device identifying processing) performed by the vehicle charging system according to the example.

With reference to FIGS. 4 to 9, operation of the vehicle charging system 1 is described. FIGS. 4 and 5 are flowcharts illustrating the procedure of charging processing (unlock request processing) performed by the vehicle charging system 1. FIGS. 6 and 7 are flowcharts illustrating the procedure of charging processing (recharging processing) performed by the vehicle charging system 1. FIGS. 8 and 9 are flowcharts illustrating the procedure of charging processing (public charging device identifying processing) performed by the vehicle charging system 1. The control unit 37 of the vehicle 3 and the control unit 57 of the charging device 5 are main components that perform the processing illustrated in FIGS. 4 to 9 repeatedly with predetermined timing.

First, with reference to FIGS. 4 and 5, the procedure of the charging processing (unlock request processing) performed by the vehicle charging system 1 is described.

After the vehicle 3 is parked in a parking lot 20, when an available power supply connector 50 of the charging device 5 or an unlocked power supply connector 50 with which charging of another vehicle 3 has been completed is coupled to (fit into) the power reception connector 30 of the vehicle 3, the charging device 5 determines whether one of the power supply connectors 50 is selected and whether the charge start switch 531 is pressed (step S100). When one of the power supply connectors 50 is selected and when the charge start switch 531 is pressed, predetermined initializing processing (coupling processing) based on the charging standard is performed, and information such as the charging parameter of the vehicle 3 is transmitted and received. Then, step S102 starts. However, when one of the power supply connectors 50 is not selected or when the charge start switch 531 is not pressed, this processing is interrupted, and step S100 is performed again with predetermined timing.

In step S102, whether power can be supplied to the specified power supply connector 50 (that is, whether power is being supplied to a specified number (e.g., two) of power supply connectors 50) is determined. If power can be supplied, power supply to the specified power supply connector 50 (i.e., charging) starts in step S104. However, if power cannot be supplied, this processing is interrupted, and step S102 is performed again with predetermined timing.

Meanwhile, in step S106, the vehicle 3 determines whether charging has started. When the charging has started, step S108 starts. However, when the charging has not started, this processing is interrupted, and step S106 is performed again with predetermined timing.

In step S108, the power reception connector 30 and power supply connector 50 are locked together. Then, the state of the charge completion indicating lamp 35 changes (e.g., the charge completion indicating lamp 35 blinks) to indicate that the power reception connector 30 and the power supply connector 50 are locked together and that the vehicle 3 is being charged (step S110). It should be noted that the lock of the power reception connector 30 and the power supply connector 50 and, for example, the door lock of a smart entry system may function in a coordinated manner.

In step S112, whether the charging of the high-voltage battery 31 has been completed is determined. When the charging of the high-voltage battery 31 has not been completed, this processing is interrupted, and step S112 is performed again with predetermined timing. However, when the charging of the high-voltage battery 31 has been completed, in step S114, information indicating charge completion is transmitted to the charging device 5.

When receiving the information indicating charge completion, the charging device 5 stops supplying power to the power supply connector 50 (vehicle 3) (step S116). It should be noted that at the time, if another vehicle 3 is coupled to one of the power supply connectors 50 and is yet to be charged, the destination to which power is supplied is switched to the power supply connector 50 coupled to another vehicle 3.

Then, in step S118, an unlock request notification to request unlocking of the locked power reception connector 30 and power supply connector 50 whose power supply has ended is sent to the vehicle 3.

When receiving the unlock request notification, the vehicle 3 unlocks the locked power reception connector 30 and power supply connector 50 (step S120). In step S122, the state of the charge completion indicating lamp 35 changes (e.g., the charge completion indicating lamp 35 illuminates) to indicate that the charging has been completed and that the power supply connector 50 is unlocked. In step S122, information indicating that the power supply connector 50 is unlocked is transmitted to the charging device 5.

When receiving the information indicating that the power supply connector 50 is unlocked, the state of the charge completion indicating lamp 55 of the charging device 5 changes (e.g., the charge completion indicating lamp 55 illuminates) to indicate that the charging has been completed and that the power supply connector 50 is unlocked (step S124). Then, this processing ends.

Next, with reference to FIGS. 6 and 7, the procedure of the charging processing (recharging processing) performed by the vehicle charging system 1 is described.

After the vehicle 3 is parked in the parking lot 20, when an available power supply connector 50 of the charging device 50 or an unlocked power supply connector 50 with which charging of another vehicle 3 has been completed is coupled to (fit into) the power reception connector 30 of the vehicle 3, the charging device 5 determines whether one of the power supply connectors 50 is selected and whether the charge start switch 531 is pressed (step S200). When one of the power supply connectors 50 is selected and when the charge start switch 531 is pressed, predetermined initializing processing (coupling processing) based on the charging standard is performed, and information such as the charging parameter of the vehicle 3 is transmitted and received. Then, step S202 starts. However, when one of the power supply connectors 50 is not selected or when the charge start switch 531 is not pressed, this processing is interrupted, and step S200 is performed again with predetermined timing.

In step S202, whether power can be supplied to the specified power supply connector 50 (that is, whether power is being supplied to a specified number (e.g., two) of power supply connectors 50) is determined. If power can be supplied, power supply to the specified power supply connector 50 (i.e., charging) starts in step S204. However, if power cannot be supplied, this processing is interrupted, and step S202 is performed again with predetermined timing.

Meanwhile, in step S206, the vehicle 3 determines whether charging has started. When the charging has started, step S208 starts. However, when the charging has not started, this processing is interrupted, and step S206 is performed again with predetermined timing.

In step S208, the power reception connector 30 and the power supply connector 50 are locked together. Then, the state of the charge completion indicating lamp 35 changes (e.g., the charge completion indicating lamp 35 blinks) to indicate that the power reception connector 30 and the power supply connector 50 are locked together and that the vehicle 3 is being charged (step S210).

Meanwhile, the charging device 5 determines whether one of the power supply connectors 50 is selected and whether the charge stop switch 532 is pressed (step S212). When one of the power supply connectors 50 is selected and when the charge stop switch 532 is pressed, step S214 starts. However, when one of the power supply connectors 50 is not selected or when the charge stop switch 532 is not pressed, this processing is interrupted, and step S212 is performed again with predetermined timing.

In step S214, power supply to the selected power supply connector 50 (vehicle 3) is stopped. Then, in step S216, an unlock request notification to request unlocking of the locked power reception connector 30 and power supply connector 50 whose power supply has been stopped is sent to the vehicle 3.

When receiving the unlock request notification, the vehicle 3 unlocks the locked power reception connector 30 and power supply connector 50 (step S218). In step S220, the state of the charge completion indicating lamp 35 changes (e.g., the charge completion indicating lamp 35 illuminates) to indicate that the charging has been completed and that the power supply connector 50 is unlocked. In step S220, information indicating that the power supply connector 50 is unlocked is transmitted to the charging device 5.

Meanwhile, in step S222, the charging device 5 determines whether the power supply connector 50 is removed from the power reception connector 30. When the power supply connector 50 is removed from the power reception connector 30, this processing ends. However, when the power supply connector 50 is not removed from the power reception connector 30, step S224 starts.

In step S224, whether a predetermined period (e.g., five minutes) has elapsed since the charge stop switch 532 was pressed is determined. When the predetermined period (e.g., five minutes) has elapsed since the charge stop switch 532 was pressed, step S226 starts. However, when the predetermined period (e.g., five minutes) has not elapsed since the charge stop switch 532 was pressed, this processing is interrupted, and step S224 is performed again with predetermined timing.

In step S226, after the initializing processing (coupling processing) is performed again, power supply to the power supply connector 50 (i.e., charging) starts.

Meanwhile, in the vehicle 3, the power reception connector 30 and the power supply connector 50 are locked together in step S228. Then, the state of the charge completion indicating lamp 35 changes (e.g., the charge completion indicating lamp 35 blinks) to indicate that the power reception connector 30 and the power supply connector 50 are locked together and that the vehicle 3 is being charged (step S230).

In step S232, whether the charging of the high-voltage battery 31 has been completed is determined. When the charging of the high-voltage battery 31 has not been completed, this processing is interrupted, and step S232 is performed again with predetermined timing. However, when the charging of the high-voltage battery 31 has been completed, in step S234, information indicating charge completion is transmitted to the charging device 5.

When receiving the information indicating charge completion, the charging device 5 stops supplying power to the vehicle 3 (step S236). It should be noted that at the time, if another vehicle 3 is coupled to one of the power supply connectors 50 and is yet to be charged, the destination to which power is supplied is switched to the power supply connector 50 coupled to another vehicle 3.

Then, in step S238, an unlock request notification to request unlocking of the locked power reception connector 30 and power supply connector 50 is sent to the vehicle 3.

When receiving the unlock request notification, the vehicle 3 unlocks the locked power reception connector 30 and power supply connector 50 (step S240). In step S242, the state of the charge completion indicating lamp 35 changes (the charge completion indicating lamp 35 illuminates) to indicate that the charging has been completed and that the power supply connector 50 is unlocked. In step S242, information indicating that the power supply connector 50 is unlocked is transmitted to the charging device 5.

When receiving the information indicating that the power supply connector 50 is unlocked, the state of the charge completion indicating lamp 55 of the charging device 5 changes (e.g., the charge completion indicating lamp 55 illuminates) to indicate that the charging has been completed and that the power supply connector 50 is unlocked (step S224). Then, this processing ends.

Next, with reference to FIGS. 8 and 9, the procedure of the charging processing (public charging device identifying processing) performed by the vehicle charging system 1 is described.

After the vehicle 3 is parked in the parking lot 20, when an available power supply connector 50 of the charging device 5 or an unlocked power supply connector 50 with which charging of another vehicle 3 has been completed is coupled to (fit into) the power reception connector 30 of the vehicle 3, the charging device 5 determines whether one of the power supply connectors 50 is selected and whether the charge start switch 531 is pressed (step S300). When one of the power supply connectors 50 is selected and when the charge start switch 531 is pressed, predetermined initializing processing (coupling processing) based on the charging standard is performed, and information such as the charging parameter of the vehicle 3 is transmitted and received. Then, step S302 starts. However, when one of the power supply connectors 50 is not selected or when the charge start switch 531 is not pressed, this processing is interrupted, and step S300 is performed again with predetermined timing.

In step S302, information indicating that the charging device 5 is a public charging device (public charging device flag) is transmitted to the vehicle 3.

When receiving the information indicating that the charging device 5 is a public charging device (public charging device flag), the storage 373 of the vehicle 3 stores the information indicating that the charging device 5 is a public charging device (public charging device flag) (step S304).

Meanwhile, in step S306, the charging device 5 determines whether power can be supplied to the specified power supply connector 50 (that is, whether power is being supplied to a specified number (e.g., two) of power supply connectors 50). If power can be supplied, power supply to the specified power supply connector 50 (i.e., charging) starts in step S308. However, if power cannot be supplied, this processing is interrupted, and step S306 is performed again with predetermined timing.

Meanwhile, in step S310, the vehicle 3 determines whether charging has started. When the charging has started, step S312 starts. However, when the charging has not started, this processing is interrupted, and step S310 is performed again with predetermined timing.

In step S312, the power reception connector 30 and the power supply connector 50 are locked together. Then, the state of the charge completion indicating lamp 35 changes (e.g., the charge completion indicating lamp 35 blinks) to indicate that the power reception connector 30 and the power supply connector 50 are locked together and that the vehicle 3 is being charged (step S314).

In step S316, whether the charging of the high-voltage battery 31 has been completed is determined. When the charging of the high-voltage battery 31 has not been completed, this processing is interrupted, and step S316 is performed again with predetermined timing. When the charging of the high-voltage battery 31 has been completed, in step S318, information indicating charge completion is transmitted to the charging device 5.

When receiving the information indicating charge completion, the charging device 5 stops supplying power to the vehicle 3 (step S320). It should be noted that at the time, if another vehicle 3 is coupled to one of the power supply connectors 50 and is yet to be charged, the destination to which power is supplied is switched to the power supply connector 50 coupled to another vehicle 3.

Then, in step S322, the vehicle 3 determines whether the charging device 5 is a public charging device (that is, whether the information indicating that the charging device 5 is a public charging device (public charging device flag) is stored). If the charging device 5 is a public charging device (if the public charging device flag is stored), step S324 starts. However, if the charging device 5 is not a public charging device (if the public charging device flag is not stored), this processing ends without unlocking the locked power reception connector 30 and power supply connector 50.

In step S324, the locked power reception connector 30 and power supply connector 50 are unlocked. In step S326, the state of the charge completion indicating lamp 35 changes (the charge completion indicating lamp 35 illuminates) to indicate that the charging has been completed and that the power supply connector 50 is unlocked. In step S326, information indicating that the power supply connector 50 is unlocked is transmitted to the charging device 5.

When receiving the information indicating that the power supply connector 50 is unlocked, the state of the charge completion indicating lamp 55 of the charging device 5 changes (e.g., the charge completion indicating lamp 55 illuminates) to indicate that the charging has been completed and that the power supply connector 50 is unlocked (step S328). Then, this processing ends.

As described in detail above, according to the embodiment, although the multiple (eight) power supply connectors 501 to 508 are coupled to the power supply 52, the number of power supply connectors 50 to which the power supply 52 can supply power concurrently (e.g., two) is less than the total number of the power supply connectors 501 to 508 (eight). That is, the number of the power supply connectors 501 to 508 (eight) coupled to the power supply 52 is greater than the number of power supply connectors 50 to which the power supply connector 52 can supply power concurrently (two). It should be noted that when charge completion is detected or when a predetermined period has elapsed since charge initiation, if another vehicle 3 is coupled to one of the power supply connectors 50 and is yet to be charged, the destination to which power is supplied is switched to the power supply connector 50 coupled to another vehicle 3. Thus, by each user who wants to charge their vehicle 3 coupling an available power supply connector 50 of the eight power supply connectors 50 to the power reception connector 30 of the vehicle 3, the vehicles 3 can be charged automatically in turn (as a result of changing the destination to which power is supplied). According to the embodiment, the power supply connector 50 that is coupled to the vehicle 3 in which charge completion is detected or in which a predetermined period has elapsed since charge initiation is automatically unlocked. In addition, when charge completion is detected or when the predetermined period has elapsed since the charge initiation, the power supply connector 50 coupled to the vehicle 3 in which charge completion is detected or in which the predetermined period has elapsed since the charge initiation is identified, and charge completion (i.e., information that the power supply connector 50 is unlocked) is indicated. Thus, a user who wants to charge their vehicle 3 can remove the power supply connector 50 from the unlocked vehicle 3 that has completed charging and couple the removed power supply connector 50 to the vehicle 3 of the user. This means that the user does not have to wait there until the power supply connector 50 becomes available. In addition, after coupling the power supply connector 50 to the vehicle 3 (power reception connector 30), the user can leave the vehicle 3. Meanwhile, the user of the vehicle 3 currently being charged (user whose vehicle started charging first) does not have to return to the place where the vehicle 3 is charged around the time when the charging is completed to remove the power supply connector 50. In addition, it is possible to suppress a part such as a coupled portion (charging port) from breaking due to an attempt to forcibly remove the locked power supply connector 50. As a result, it is possible to provide a more convenient vehicle charging system capable of using the charging device 5 more efficiently.

According to the embodiment, after a charge stop instruction is received in a state in which charging has not been completed or in a state in which a predetermined period has not elapsed since charge initiation, if the power supply connector 50 is not removed for a fixed period (e.g., five minutes), the charging is restarted. Thus, by performing, for example, an incorrect operation on the charge stop switch 532, if a user unintentionally stopped charging the vehicle 3 of another user instead of the vehicle 3 of the user, it is possible to suppress an occurrence of insufficient charging.

According to the embodiment, if information indicating that the charging device 5 is a public charging device (public charging device flag) is stored, after charge completion is detected or after a predetermined period has elapsed since charge initiation, the power supply connector 50 is unlocked. However, if the information indicating that the charging device 5 is a public charging device is not stored, even after charge completion is detected or even after the predetermined period has elapsed since the charge initiation, the power supply connector 50 is not unlocked. That is, whether the charging device 5 is a public charging device is identified (that is, whether the charging device 5 is a public charging device or a home charging device is identified). Then, if the charging device 5 is a public charging device, when charging has been completed, the power supply connector 50 is unlocked. Thus, a user who wants to charge their vehicle 3 can use the power supply connector 50 with which charging of another vehicle 3 has been completed. Meanwhile, if the information indicating that the charging device 5 is a public charging device is not stored (that is, the charging device is a home charging device), the power supply connector 50 is not unlocked even after the charging has been completed. Thus, it is possible to suppress the power supply connector 50 and the charging cable 51 from being stolen.

According to the embodiment, the order in which the vehicles 3 are charged is set to the order in which charge start instructions have been received, and the vehicles 3 are charged in the set order. Thus, by each user who wants to charge their vehicle 3 coupling one of the power supply connectors 50 to the power reception connector 30 of the vehicle 3, the vehicles 3 can be charged automatically in turn (as a result of changing the destination to which power is supplied) in the order in which the charge start instructions have been received.

For this example, precedence is set for the order in which the vehicles 3 are charged and/or the amount of time to charge each of the vehicles 3, and in accordance with the precedence, the order in which the vehicles 3 are charged and/or the amount of time to charge each of the vehicles 3 is changed. Thus, the vehicles 3 can be charged in accordance with the precedence (i.e., some of the vehicles 3 that take precedence over the rest are charged first).

According to the embodiment, the status of each user is obtained, and precedence is set in consideration of the status of each user. Thus, the precedence can be set in consideration of the status of each user (e.g., whether the user is a special member).

According to the embodiment, when changing a destination to which power is supplied between the power supply connectors 50, an overlap region is provided in which power supplied to the next power supply connector 50 to receive power is increased in accordance with a decrease in power supplied to the power supply connector 50 currently receiving power. Thus, when charging the vehicles 3 in turn, the total amount of time to charge the vehicles 3 can be shortened, thereby making it possible to use the charging device 5 more efficiently.

According to the embodiment, when a wakeup signal is interrupted in a state in which charging has not been completed and in which the power supply connector 50 is coupled to the vehicle 3, the activated state of the vehicle 3 is maintained for a predetermined period after the wakeup signal is interrupted. That is, even after the wakeup signal is interrupted, the activated state of the vehicle 3 can be maintained for the predetermined period. Thus, it is possible for the vehicle 3 to send a recharge request to the charging device 5, for example.

According to the embodiment, the eight (or more) power supply connectors 501 to 508 are coupled to the power supply 52. Thus, a user can leave their vehicle 3 after coupling an available power supply connector 50 to the vehicle 3 (power reception connector 30). This means that the user who wants to charge their vehicle 3 does not have to wait there until the power supply connector 50 becomes available. Meanwhile, the user of the vehicle 3 currently being charged (user whose vehicle started charging first) does not have to return to the place where the vehicle 3 is charged around the time when the charging is completed to remove the power supply connector 50 from the vehicle 3. This can make the vehicle charging system more convenient.

Although the embodiment of the disclosure is described above, the disclosure is not limited to the above embodiment, but various modifications can be made to the embodiment. For example, the total number of the power supply connectors 50 and the number of power supply connectors 50 to which power can be supplied concurrently (that is, the number of vehicles 3 capable of being charged concurrently) are not limited to the numbers described in the embodiment, but any numbers can be set. Likewise, the number of charging devices 5 can be set to any numbers. In addition, for the above embodiment, the eight power supply connectors 501 to 508 are coupled to the charging device 5. Alternatively, for example, eight charging devices 5 coupled to a power supply connector 50 may be provided, and charging devices in operation may be switched between four pairs made from the eight charging devices 5.

For the above embodiment, the vehicle 3 (power reception connector 30) has the lock mechanism 301, and unlocking is performed in the vehicle 3. However, the power supply connector 50 may have a lock mechanism, and unlocking may be performed in the charging device 5.

Moreover, the information indicating that the charging device 5 is a public charging device (charger) can be obtained from, for example, the information of a car navigation system (e.g., information indicating whether the location in which the vehicle 3 is parked is a public facility).

The disclosure enables provision of a more convenient vehicle charging system capable of using a charging device more efficiently.

The invention claimed is:

1. A vehicle charging system, comprising:
a plurality of power supply connectors each coupleable to a power reception connector of a vehicle;
a power supply coupled to the plurality of power supply connectors and capable of supplying power to at least one of the plurality of power supply connectors;
a charge completion detector configured to detect charge completion;
a switching unit configured to, when charge completion in a first vehicle is detected, if a second vehicle is coupled to one of the plurality of power supply connectors and is yet to be charged, change a destination to which the power supply outputs power to the power supply connector coupled to the second vehicle;
an unlocking unit configured to, when charge completion is detected, automatically unlock a power supply connector coupled to a vehicle in which charge completion is detected, the power supply connector being one of the plurality of power supply connectors; and
a charge completion indicator configured to, when charge completion is detected, identify the power supply connector coupled to the vehicle in which charge completion is detected and indicate charge completion,
wherein, after a charge stop instruction is received in the vehicle charging system, in a state in which charging is incomplete or in a state in which a predetermined period is unelapsed since a charge initiation, and a power supply connector of the power supply connectors, whose power supply is to be stopped, is not removed for a fixed period, the power supply restarts charging.

2. The vehicle charging system according to claim 1, wherein a total number of power supply connectors to which the power supply is capable of supplying power concurrently is less than a total number of the plurality of power supply connectors.

3. The vehicle charging system according to claim 1, wherein, when charge completion in the first vehicle is detected or when a predetermined period has elapsed since charge initiation in the first vehicle, if the second vehicle is coupled to one of the plurality of power supply connectors, the switching unit changes the destination to which the power supply outputs power to the power supply connector coupled to the second vehicle,
wherein, when charge completion in the first vehicle is detected or when the predetermined period has elapsed since the charge initiation in the first vehicle, the unlocking unit automatically unlocks a power supply connector coupled to the first vehicle in which charge completion is detected or in which the predetermined period has elapsed since the charge initiation, the power supply connector being one of the plurality of power supply connectors, and
wherein, when charge completion is detected in the first vehicle or when the predetermined period has elapsed since the charge initiation in the first vehicle, the charge completion indicator identifies the power supply connector coupled to the first vehicle in which charge completion is detected or in which the predetermined period has elapsed since the charge initiation and indicates charge completion.

4. The vehicle charging system according to claim 1, further comprising:
a stop instruction receiving unit configured to receive the charge stop instruction to specify the power supply connector whose power supply is to be stopped, among the plurality of power supply connectors and stop charging,
wherein, after the charge stop instruction is received in the state in which charging is incomplete, if the power supply connector, whose power supply is to be stopped, is not removed for the fixed period, the power supply restarts the charging.

5. The vehicle charging system according to claim 1, further comprising:
storage capable of storing information indicating that a charging device of the vehicle charging system includes a public charging device,
wherein, if the storage stores the information indicating that the charging device of the vehicle charging system includes a public charging device, after charge completion is detected, the unlocking unit unlocks the power supply connector coupled to the vehicle in which charge completion is detected, and
wherein, if the storage does not store the information indicating that the charging device of the vehicle charging system is a public charging device, after charge completion is detected, the unlocking unit does not unlock the power supply connector coupled to the vehicle in which charge completion is detected.

6. The vehicle charging system according to claim 5, wherein, if the storage stores the information indicating that the charging device of the vehicle charging system includes a public charging device, after charge completion is detected or after the predetermined period has elapsed since the charge initiation, the unlocking unit unlocks a power supply connector coupled to a vehicle in which charge completion is detected or in which the predetermined period has elapsed since the charge initiation, the power supply connector being one of the plurality of power supply connectors, and
wherein, if the storage does not store the information indicating that the charging device of the vehicle charging system includes a public charging device, after charge completion is detected or after the predetermined period has elapsed since the charge initiation, the unlocking unit does not unlock the power supply connector coupled to the vehicle in which charge completion is detected or in which the predetermined period has elapsed since the charge initiation.

7. The vehicle charging system according to claim 1, further comprising:
a start instruction receiving unit configured to receive a charge start instruction to specify a power supply connector whose power supply is to be started, among the plurality of power supplying connectors and start charging,
wherein the switching unit sets an order in which vehicles are charged to an order in which charge start instructions have been received and changes the destination to which power is supplied between at least two of the plurality of power supply connectors in set order.

8. The vehicle charging system according to claim 7, further comprising:
a precedence setting unit configured to set precedence for the order in which the vehicles are charged,
wherein, in accordance with the precedence set by the precedence setting unit, the switching unit changes the order in which the vehicles are charged.

9. The vehicle charging system according to claim 8, wherein the precedence setting unit sets precedence for the order in which the vehicles are charged and/or an amount of time to charge each of the vehicles, and wherein, in accordance with the precedence set by the precedence setting unit, the switching unit changes the order in which the vehicles are charged and/or the amount of time to charge each of the vehicles.

10. The vehicle charging system according to claim 8, further comprising:
a status obtaining unit configured to obtain a status of each user,
wherein the precedence setting unit sets the precedence in consideration of the status of each user obtained by the status obtaining unit.

11. The vehicle charging system according to claim 1, wherein, when the switching unit changes the destination to which power is supplied between two power supply connectors of the plurality of power supply connectors, an overlap region is provided in which power supplied to one of the two power supply connectors that is the next one to receive power is increased in accordance with a decrease in power supplied to the other power supply connector currently receiving power.

12. The vehicle charging system according to claim 1, further comprising:
an activation signal outputting unit configured to output a wakeup signal for starting a power source system of a vehicle, via one of the plurality of power supply connectors,
wherein, if the wakeup signal is interrupted in a state in which charging of the vehicle has not been completed and in which the vehicle is coupled to the power supply connector, an activated state of the vehicle is maintained for a predetermined period after the wakeup signal is interrupted.

13. The vehicle charging system according to claim 1, wherein the power supply is coupled to at least four power supply connectors.

14. The vehicle charging system according to claim 1, wherein, after the charge stop instruction is received in the vehicle charging system, in the state in which charging is incomplete, and the power supply connector of the power supply connectors, whose power supply is to be stopped, is not removed for the fixed period, the power supply restarts the charging.

15. The vehicle charging system according to claim 1, wherein, after the charge stop instruction is received in the vehicle charging system, in the state in which the predetermined period is unelapsed since the charge initiation, and the power supply connector of the power supply connectors, whose power supply is to be stopped, is not removed for a fixed period, the power supply restarts the charging.

16. A vehicle charging system, comprising:
a plurality of power supply connectors each coupleable to a power reception connector of a vehicle;
a power supply coupled to the plurality of power supply connectors and capable of supplying power to at least one of the plurality of power supply connectors; and
a circuitry configured to:
detect charge completion;
change, when charge completion in a first vehicle is detected, if a second vehicle is coupled to one of the plurality of power supply connectors and is yet to be charged, a destination to which the power supply outputs power to the power supply connector coupled to the second vehicle,
automatically unlock, when charge completion is detected, a power supply connector coupled to a vehicle in which charge completion is detected, the power supply connector being one of the plurality of power supply connectors; and
identify, when charge completion is detected, the power supply connector coupled to the vehicle in which charge completion is detected and indicate charge completion,
wherein, after a charge stop instruction is received in the vehicle charging system, in a state in which charging is incomplete or in a state in which a predetermined period is, unelapsed since a charge initiation, and a power supply connector of the power supply connectors, whose power supply is to be stopped, is not removed for a fixed period, the power supply restarts charging.

17. The vehicle charging system according to claim 16, wherein, after the charge stop instruction is received in the vehicle charging system, in the state in which charging is incomplete, and the power supply connector of the power supply connectors, whose power supply is to be stopped, is not removed for the fixed period, the power supply restarts the charging.

18. The vehicle charging system according to claim 16, wherein, after the charge stop instruction is received in the vehicle charging system, in the state in which the predetermined period is unelapsed since the charge initiation, and the power supply connector of the power supply connectors, Whose power supply is to be stopped, is not removed for a fixed period, the power supply restarts the charging.

19. The vehicle charging system according to claim 16, wherein the circuitry is further configured to receive the charge stop instruction to specify the power supply connector whose power supply is to be stopped, among the plurality of power supply connectors and stop charging, and
wherein, after the charge stop instruction is received in the state in which charging is incomplete, if the power supply connector, whose power supply is to be stopped, is not removed for the fixed period, the power supply restarts the charging.

* * * * *